US009482751B2

(12) United States Patent
Mandava et al.

(10) Patent No.: US 9,482,751 B2
(45) Date of Patent: Nov. 1, 2016

(54) COLLISION DETECTION SYSTEM AND METHOD OF OPERATION

(71) Applicant: APPLIED CONCEPTS, INC., Plano, TX (US)

(72) Inventors: Mahendra Mandava, Richardson, TX (US); Robert S. Gammenthaler, Princeton, TX (US)

(73) Assignee: APPLIED CONCEPTS, INC., Plano, TX (US)

( * ) Notice: Subject to any disclaimer, the term of this patent is extended or adjusted under 35 U.S.C. 154(b) by 0 days.

(21) Appl. No.: 14/513,084

(22) Filed: Oct. 13, 2014

(65) Prior Publication Data

US 2016/0103218 A1    Apr. 14, 2016

(51) Int. Cl.
| | | |
|---|---|---|
| *G01S 13/93* | (2006.01) |
| *B60Q 5/00* | (2006.01) |
| *B60Q 9/00* | (2006.01) |
| *G01S 13/72* | (2006.01) |
| *G01S 13/86* | (2006.01) |

(52) U.S. Cl.
CPC ............... *G01S 13/931* (2013.01); *B60Q 5/00* (2013.01); *B60Q 9/008* (2013.01); *G01S 13/723* (2013.01); *G01S 13/86* (2013.01); *G01S 2013/9375* (2013.01); *G01S 2013/9378* (2013.01)

(58) Field of Classification Search
CPC ................................ G01S 13/931; B60Q 5/00
USPC ......................................................... 701/301
See application file for complete search history.

(56) References Cited

U.S. PATENT DOCUMENTS

| | | | |
|---|---|---|---|
| 5,525,996 A | 6/1996 | Aker et al. | |
| 5,528,245 A | 6/1996 | Aker et al. | |
| 5,565,871 A | 10/1996 | Aker et al. | |
| 5,570,093 A | 10/1996 | Aker et al. | |
| D405,333 S | 2/1999 | Wrigley | |
| 5,979,586 A * | 11/1999 | Farmer | B60Q 9/008 180/169 |
| 5,982,105 A | 11/1999 | Masters | |
| 6,085,151 A * | 7/2000 | Farmer | G01S 7/023 342/70 |
| 6,198,427 B1 | 3/2001 | Aker et al. | |
| 6,292,111 B1 * | 9/2001 | Ishikawa | H04N 7/183 180/167 |
| 6,501,418 B1 | 12/2002 | Aker | |
| 6,580,386 B1 | 6/2003 | Aker et al. | |
| 6,646,591 B2 | 11/2003 | Aker et al. | |
| 6,744,379 B1 | 6/2004 | Aker et al. | |
| 6,831,593 B2 | 12/2004 | Aker et al. | |
| 6,853,314 B1 | 2/2005 | Aker et al. | |
| 6,864,832 B2 | 3/2005 | Mende et al. | |
| 7,038,614 B1 | 5/2006 | Aker | |
| 7,049,999 B1 | 5/2006 | Aker | |
| 7,057,550 B1 | 6/2006 | Aker | |
| 7,068,212 B2 | 6/2006 | Aker et al. | |
| 7,190,882 B2 | 3/2007 | Gammenthaler | |
| 7,218,271 B2 | 5/2007 | Aker et al. | |
| 7,227,494 B2 | 6/2007 | Aker | |

(Continued)

*Primary Examiner* — Behrang Badii
*Assistant Examiner* — Michael Berns
(74) *Attorney, Agent, or Firm* — Jackson Walker LLP; Christopher J. Rourk (57) ABSTRACT

A system for detecting driver vehicle travelling in an unsafe manner comprising a radar system configured to generate a sequence of frames of radar data. A target trajectory system configured to receive the sequence of frames of radar data and to generate target trajectory data for a vehicle. An alarm system configured to receive the target trajectory data and to generate an alarm as a function of the target trajectory data, a probability of collision, a degree of erratic driving or other suitable data.

32 Claims, 4 Drawing Sheets

(56) References Cited

U.S. PATENT DOCUMENTS

| | | |
|---|---|---|
| 7,365,676 B2 | 4/2008 | Mende |
| 7,388,474 B2 * | 6/2008 | Yagyu ................... B60Q 5/005 340/328 |
| 7,409,294 B2 | 8/2008 | Mead et al. |
| 7,411,544 B2 | 8/2008 | Aker et al. |
| 7,548,186 B2 | 6/2009 | Mende et al. |
| 7,579,786 B2 | 8/2009 | Soos |
| 7,672,782 B2 | 3/2010 | Mead et al. |
| 7,864,102 B2 | 1/2011 | Aker |
| 7,982,660 B2 | 7/2011 | Meinecke et al. |
| 8,125,622 B2 | 2/2012 | Gammenthaler |
| 8,138,966 B2 | 3/2012 | Aker |
| 8,378,884 B2 | 2/2013 | Aker |
| 8,393,601 B2 | 3/2013 | de Mola |
| 8,441,622 B2 | 5/2013 | Gammenthaler |
| 8,534,718 B2 | 9/2013 | de Mola |
| 8,610,881 B2 | 12/2013 | Gammenthaler |
| 2010/0106418 A1 * | 4/2010 | Kindo ................ B60W 40/072 701/300 |
| 2012/0101711 A1 * | 4/2012 | Furmston ............... G01S 7/415 701/300 |
| 2013/0216094 A1 * | 8/2013 | DeLean ............ G06K 9/00335 382/103 |

* cited by examiner

LEGEND

VC: VEHICLE TRAVELLING IN AN UNSAFE MANNER
VP: PATROL VEHICLE
TO: OBSERVED AND TRACKED TRAJECTORY OF VEHICLE VC
TP: PREDICTED OR ESTIMATED TRAJECTORY OF VEHICLE VC
PC: PDF (PROBABILITY DENSITY FUNCTION) OF COLLISION PROBABILITY
AS A FUNCTION OF COLLISION POINT COORDINATE
XC: COORDINATE POSITION OF POINT OF COLLISION

FIGURE 6   600

COLLISION DETECTION SYSTEM AND METHOD OF OPERATION

TECHNICAL FIELD

The present disclosure relates generally to vehicular radar, and more specifically to a vehicular radar system for collision detection and an associated method of operation.

BACKGROUND OF THE INVENTION

Speed detection radar can identify vehicles using reflected radar signals and can associate each vehicle with a corresponding speed. However, a vehicle that is traveling at a lawful speed might still collide with a parked patrol car, due to driver incapacity. In such cases, the speed detection radar alone cannot generate an alarm to alert an officer to the potential danger.

SUMMARY OF THE INVENTION

A system for detecting a vehicle travelling in an unsafe manner is provided that includes a radar system configured to generate a sequence of frames of radar data. A target trajectory system receives the sequence of frames of radar data and generates target trajectory data for a vehicle. An alarm system receives the target trajectory data and generates an alarm as a function of the target trajectory data.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

In the description that follows, like parts are marked throughout the specification and drawings with the same reference numerals. The drawing figures might not be to scale and certain components can be shown in generalized or schematic form and identified by commercial designations in the interest of clarity and conciseness.

Figure 1:
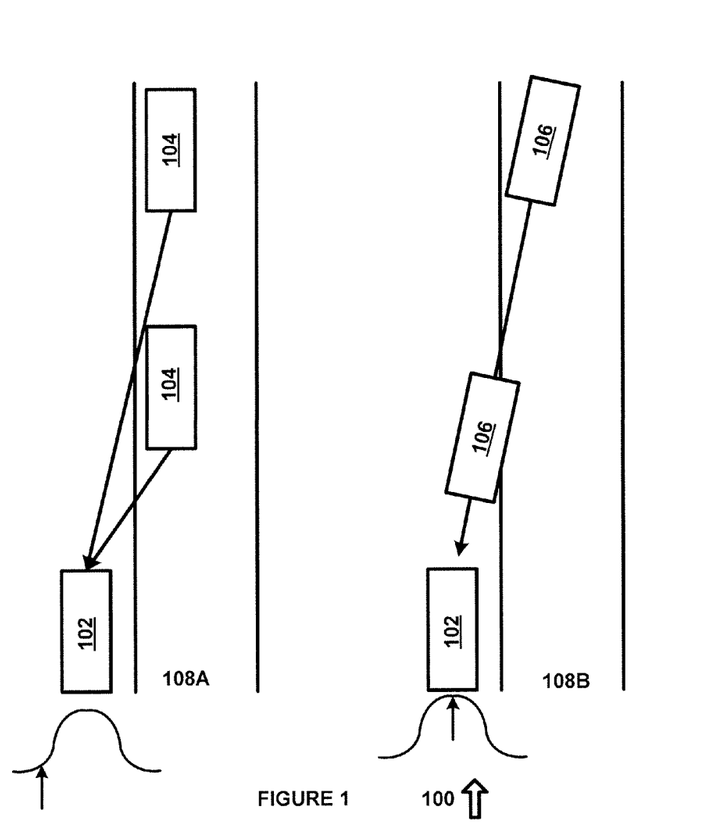
FIG. 1 is a diagram of a system in accordance with an exemplary embodiment of the present disclosure.

FIG. 1 is a diagram of a system 100 in accordance with an exemplary embodiment of the present disclosure. System 100 includes patrol car 102, which includes a collision detection system that can determine the trajectory, speed and range of an oncoming vehicle. Road 108A shows a vehicle 104 at two locations. At the first location, vehicle 104 has an angle relative to patrol car 102 that is different from the angle of vehicle 104 at the second location. The changing angle here is indicative that vehicle 104 is not heading in the direction of patrol car 102, which is parked on the side of road 108A. The possibility of a collision can be associated with a probability density function. Here the projected chance of a collision is small, as shown by the location of the arrow on the probability distribution curve. The likelihood of collision can be approximated based on the probability that the vehicle 104 will change course and collide with patrol car 102, which can be based on a number of different factors, as discussed herein.

In contrast, the angle of vehicle 106 on road 108B is relatively constant in a direction towards patrol car 102, which is indicative that vehicle 106 is on a collision course with patrol car 102. This vehicular behavior can indicate that the driver of vehicle 106 is impaired (such as due to the effects of alcohol, medicine, illegal drugs, inattentiveness, lack of sleep, or other causes), as many types of impairment can result in a driver focusing on flashing lights, parking lights or other lights that might be associated with patrol car 102, such as the tendency of certain types of impaired driver to follow a car that is driving in front of the impaired drivers vehicle. Based on the speed and distance between vehicle 106 and patrol car 102, and the trajectory, the collision detection system on patrol car 102 can generate an alarm to alert the officer of a potential collision. This situation can also be associated with a probability density function, where the projected chance of a collision is large, as shown by the location of the arrow on the probability distribution curve. The probability density function may need to be determined stochastically or empirically, and there may be different probability density functions associated with different types of impairment, different distances and speeds or other variables. For example, a driver under the influence of alcohol might tend to swerve when there is no vehicle in front, but might follow a vehicle in front even when the vehicle is driving unsafely. A driver that is inattentive might have periods where they are paying attention, followed by periods where they drive poorly due to focusing on an electronic device or other distractions. The disclosed prediction algorithm takes into account these different types of impairment, to the extent that it can be determined from the vehicle speed, distance and trajectory, as well as the behavior of surrounding vehicles, the time of day, the layout of the road and other variables. As such, the variation in the probability density function over time for a first approaching car can be different from the variation in the probability density function over time for a second approaching car, based on the speed, distance, trajectory and other characteristics of each car. Likewise, a weighting factor can also be applied to a probability density function based on the speed or location of the vehicle, such as to provide additional emphasis to cars that are driving erratically if they are closer to the patrol car and are approaching at a higher speed.

When determining a likelihood of a stationary or slowly moving vehicle (primary vehicle) along the roadside being hit by another vehicle (closing vehicle), the probability of the trajectory of the closing vehicle intersecting with the outline of the primary vehicle can be evaluated to determine if it exceeds a certain threshold to activate a crash alert alarm. Also, a priori information about the location and orientation of the primary vehicle along with road map (GIS) information can be used to enhance the collision probability calculations.

For a vehicle 104 or 106, the probability of the vehicle impact can be determined from a probability density function, by calculating the area under the probability distribution as bounded by the extremities of collision points, and which gives a total probability of collision. When the probability exceeds a threshold, that metric can be used to activate an alarm. There are different approaches/algorithms that can be conceived and applied to come up with the predicted trajectories and the probability distribution (including Kalman filter methods). In addition, there may be different types of alarms that are generated based on the detected impaired driving activity. For example, detecting a car that is weaving and isolated (which may indicate driving under the influence of alcohol), but which is more than one mile away, could be used to generate a slow, periodic chirp with a high frequency tone, to warn an officer to be alert. A single chirp could be used to designate a vehicle that is approaching from the front of the patrol car, whereas a double chirp could be used to designate a vehicle that is approaching from the rear. The speed of the chirps can be increased to indicate the relative location of the approaching vehicle, and the frequency of the tone can be increased or decreased to indicate the relative speed of the vehicle. A steady tone that increases in volume could be used to designate a vehicle that is driving on a trajectory that is straight at the patrol car. In this manner, an officer who is outside of their vehicle can be provided with information that can be used by the officer to be on the lookout for an approaching vehicle that is travelling in an unsafe manner, to allow the officer to take evasive action, to allow the officer to determine whether the patrol vehicle can be used as a shield or to make other decisions.

Figure 2:
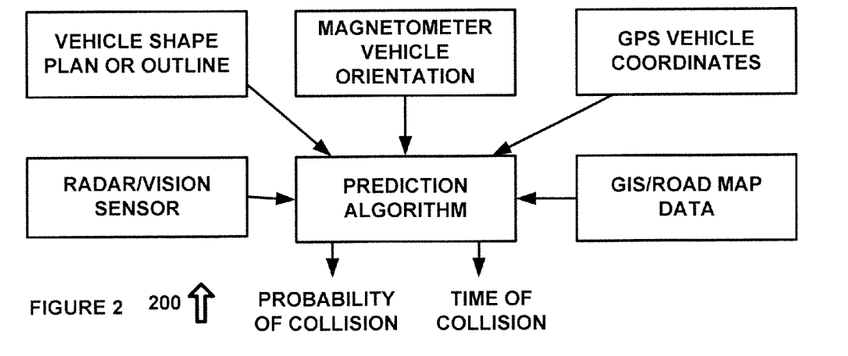
FIG. 2 is a diagram of an algorithm in accordance with an exemplary embodiment of the present disclosure.

FIG. 2 is a diagram of an algorithm 200 in accordance with an exemplary embodiment of the present disclosure. Algorithm 200 receives inputs from radar and/or vision sensors, a vehicle shape plan or outline, a magnetometer for vehicle orientation, GPS vehicle coordinates and road map data, and generates a probability of collision and a time of collision that can be used to actuate the alarm.

Figure 3:
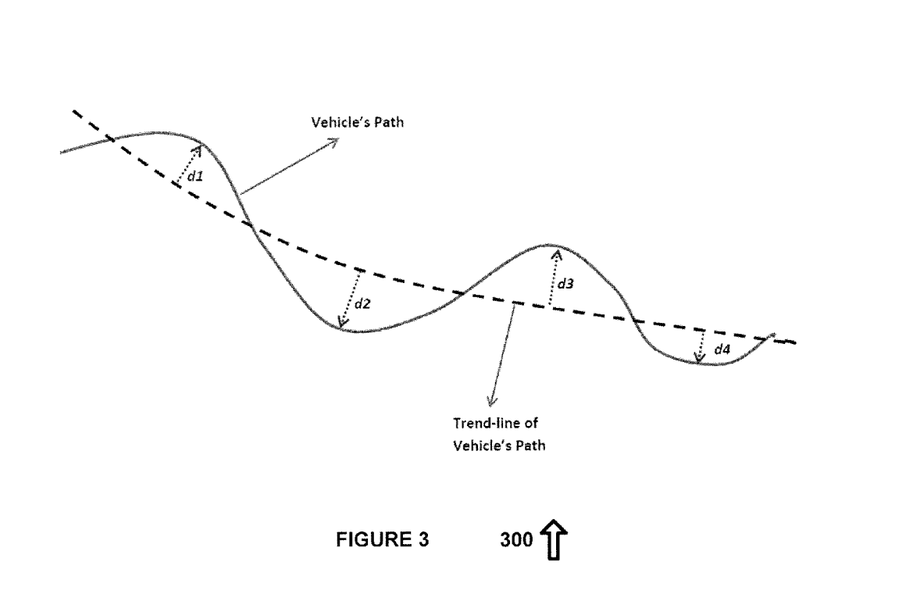
FIG. 3 is a diagram showing how a vehicle can be considered to be travelling in an unsafe manner if it can be determined that it is weaving excessively or has a wobbly path.

Another input considered by algorithm 200 is the erratic path of the approaching vehicle. FIG. 3 is a diagram showing how a driver can be considered to be driving recklessly or in an impaired manner if it can be determined that they are weaving excessively or have a wobbly path. If the number and degree of deviations d1, d2, d3 and d4 of the vehicle's path from its trend line trajectory are found to be above certain thresholds in a certain period of time or over a certain distance, an alert can be activated in addition to providing a factor considered by algorithm 200. A second order curve fit can be used to determine its trajectory or trend line. A metric that determines the degree of wobbliness of the closing vehicle's trajectory with respect to the trend-line of its trajectory can also be used as an aid to validate the interception by traffic law enforcement of the closing vehicle for impaired or reckless driving.

Figure 4:
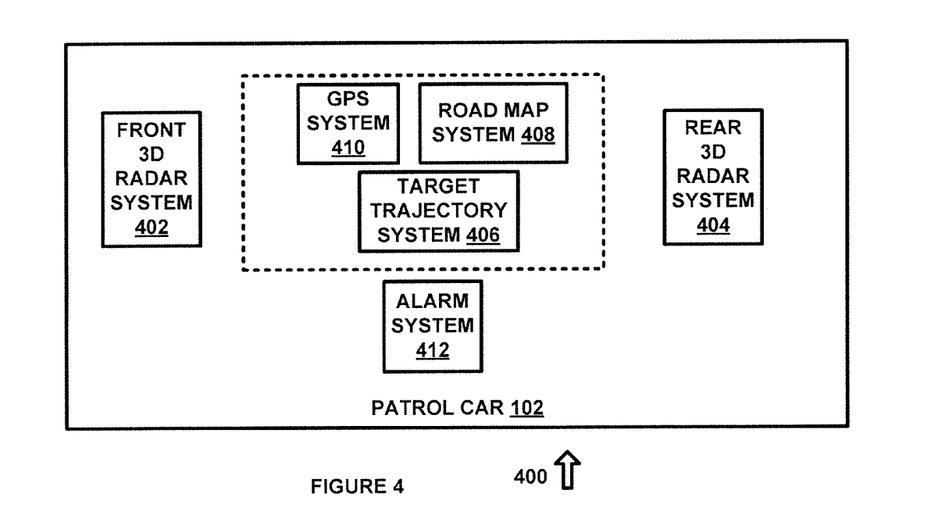
FIG. 4 is a diagram of a system for detecting a collision in accordance with an exemplary embodiment of the present disclosure.

FIG. 4 is a diagram of a system 400 for detecting a collision in accordance with an exemplary embodiment of the present disclosure. System 400 includes patrol car 102, front 3D radar system 402, back 3D radar system 404, target trajectory system 406, road map system 408, GPS system 410 and alarm system 412, each of which can be implemented in hardware or a suitable combination of hardware and software. The systems shown within a dashed line can be implemented as one or more software systems operating on a suitable processor. The 3D radar systems 402 and 404 can each have separate microwave transceiver front-ends, processors that generate target speed data, target range data, target angle data, target trajectory data, or other suitable data, and other suitable components. 3D radar systems 402 and 404 transmit radar frequency electromagnetic waves and receive reflected signals, for identifying objects that reflect radar frequency signals. In one exemplary embodiment, 3D radar systems 402 and 404 can include one, two, three or other suitable numbers of radar transmitters and receivers, where 2 or more antennae are used for 3 dimensional radar (distance, speed, time and left-right angle), 3 or more antennae are used for 4 dimensional radar (distance, speed, time, left-right angle and up-down angle) or other suitable sensors can also or alternatively be used, such as optical sensors for range, speed, angle of arrival and license plate identification.

As used herein, "hardware" can include a combination of discrete electronic components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes a microcomputer or other suitable controller, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

The 3D radar systems 402 and 404 transmit and receive radar data and analyze the radar data to identify one or more targets in the radar data that are moving vehicles. In one exemplary embodiment, 3D radar systems 402 and 404 can each generate frames of radar data and can analyze the frames of radar data using Fourier analysis and/or other suitable processing to identify frequency components of the signal or other signal artifacts that represent moving vehicles. In this exemplary embodiment, each vehicle can reflect radar frequency signals that have associated frequency or other signal characteristics associated with the position and speed of that vehicle, the distance between 3D system 402 or 404 and the vehicle, the angle between 3D radar system 402 or 404 and the vehicle and other suitable data. In this exemplary embodiment, 3D radar systems 402 and 404 can each have one or more radar signal transmitters and two or more radar receiver antennae, where each antennae is separated by a predetermined distance, and where the transmitted radar signals are modulated with a signal waveform that is used to determine the time required for the radar signal to travel from 3D radar system 404 or 404 to the vehicle and for the reflected signal to return to 3D radar system 402 or 404, respectively. Using radar signal data, 3D radar systems 402 and 404 can distinguish different vehicles that differ in at least one of the three different parameters of speed, distance or angle.

3D radar systems 402 and 404 each associate targets with a unique identifier to allow the target to be tracked and uniquely identified. In one exemplary embodiment, 3D radar systems 402 and 404 can track identified vehicles in successive frames of radar data and can associate the identified vehicles in the successive frames, such as by processing Fourier transform and/or other data to track vehicle location, vehicle speed, trajectory or in other suitable manners. Each target can be associated with a target identifier that is randomly generated, with a target identifier that is generated in a sequential order or with a target identifier that is generated based on time-stamped position data associated with that target or with other suitable data.

Target trajectory system 406 generates angular direction of travel data for each of a plurality of targets and tracks changes in position to identify vehicles that are driving outside of an expected path. In one exemplary embodiment, target trajectory system 406 can determine a trajectory for each of the plurality of vehicles relative to an installation position, relative to a compass heading from a system that generates digital compass direction data or in other suitable manners, and can track the angle for each vehicle over time, to determine whether the vehicle is maintaining a constant angle that indicates that the vehicle is driving directly towards an associated radar system, whether the vehicle is changing its position in a manner that indicates that it is not following a curving roadway, whether a vehicle is weaving, or whether the vehicle is otherwise driving erratically and in a manner that requires the officer to be alerted, or other suitable data.

Road map system 408 receives GPS data from GPS system 410 and generates road location data for processing vehicle trajectory data to generate alarm data, or for other suitable purposes. In one exemplary embodiment, road map system 408 can receive GPS data that identifies a location associated with a patrol vehicle, and can receive map data for identifying a location associated with a target vehicle, such as by tracking the movements of the target vehicle as it travels. In this exemplary embodiment, if the patrol vehicle stops at a location, such as by putting the vehicle into park, a signal can be generated that causes road map system 408 to calculate an expected angle between target vehicles on the road and the patrol car that includes a 3D radar system or other suitable systems that generate radar data. In this exemplary embodiment, a target vehicle traveling towards the patrol car will have an expected angle relative to the patrol car and based on the road direction. For a road that is nearly straight, a target vehicle will have an angle that is nearly 0 degrees, whereas for a road that turns, the angle could vary from plus or minus 180 degrees or more. Road map system 408 allows target vehicles that are following the road to be distinguished from target vehicles that might be leaving the road on a collision course towards a patrol car associated with road map system 408, target vehicles that are weaving, or other target vehicles of interest.

GPS system 410 generates location data for a vehicle associated with GPS system 410, such as by using a Global Positioning System (GPS) location system or other suitable systems. In one exemplary embodiment, GPS system 410 can receive signals from geosynchronous satellites that include timing data that can be used to locate the position of GPS system 410 in a predetermined three dimensional coordinate system, or other suitable data. In one exemplary embodiment, road map system 408 can receive position data from GPS system 410 or other suitable positioning data and can locate a roadway associated with the map information and position data and track the progress of a vehicle in relation to the roadway over time or in other suitable manners.

Alarm system 412 receives data from target trajectory system 406 or other suitable systems and generates an alarm if it is determined that a tracked vehicle is deviating from an expected course, that a tracked vehicle is weaving, that a tracked vehicle is on a collision course or other suitable data. In one exemplary embodiment, alarm system 412 can generate varying levels of alarm data as a function of the distance between the patrol car associated with alarm system 412 and the type of vehicular behavior being tracked. In this exemplary embodiment, a vehicle that is deviating from an expected angle relative to a patrol vehicle but which is otherwise at a significant distance from the patrol vehicle and where the road is not straight can result in a low level alarm, such as a chirp generated by a system with a controllable audio signal, whereas a vehicle that is closer to the patrol vehicle and which is outside of the expected variation for vehicles on the roadway can result in a high level alarm, such as activation of the siren associated with the patrol vehicle.

In operation, system 400 detects an impending collision by monitoring the trajectory of a vehicle to determine whether the vehicle is on a collision course with a patrol car that includes system 400, whether the vehicle is weaving, whether the vehicle is not following an expected roadway or for other suitable indicators of a vehicle travelling in an unsafe manner. System 400 generates multiple levels of alarms as a function of distance or possible impairment, to allow an officer to take defensive or enforcement action.

Figure 5:
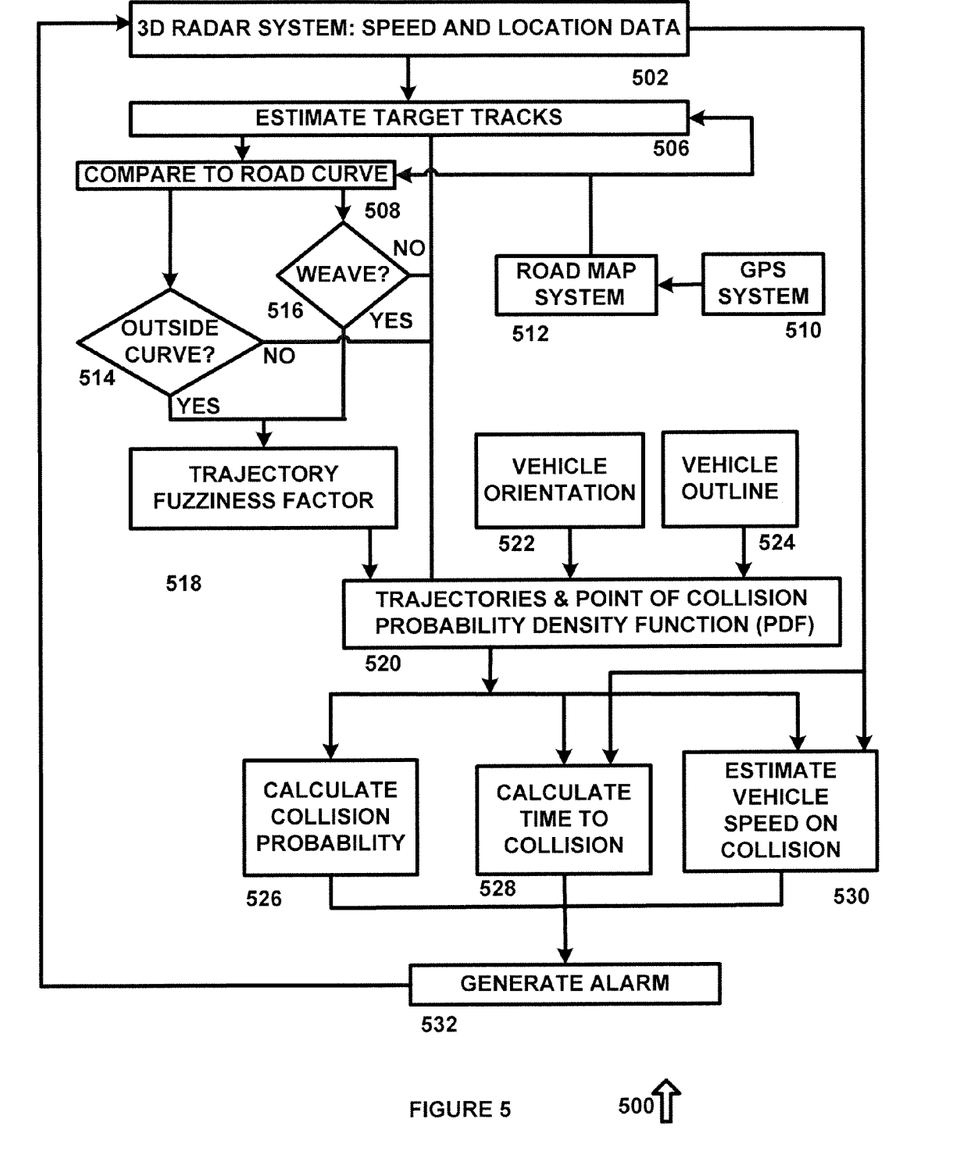
FIG. 5 is a diagram of an algorithm for detecting impaired driving, in accordance with an exemplary embodiment of the present disclosure.

FIG. 5 is a diagram of an algorithm 500 for determining whether a vehicle is travelling in an unsafe manner, and the likelihood and imminence of a collision, in accordance with an exemplary embodiment of the present disclosure. Algorithm 500 can be implemented in hardware or a suitable combination of hardware and software, and can be one or more algorithms operating on one or more processors and associated equipment such as a display, a keyboard, a mouse, random access memory, magnetic or integrated long term data memory, input output devices, network interfaces, wireless interfaces and other suitable equipment.

Algorithm 500 begins at 502, where the 3D radar provides time-stamped distance, speed and angle data of targets. The algorithm then proceeds to 506.

At 506, the target tracks are determined. In one exemplary embodiment, a GPS system or other suitable system that generates location data can be used at 510 to identify a location for a patrol car that operates a radar system, and can provide the location data to a road map data system at 512 to identify a nearby roadway and to estimate the trajectory for vehicles on the roadway relative to the radar system. The algorithm then proceeds to 512.

At 512, the target tracks from 506 are used in combination with the road map data to estimate the likely trajectories of the vehicles using stochastic and prediction models. In one exemplary embodiment, each vehicle can be mapped to a location on the roadway nearest the patrol car, so as to allow for changes in the direction of the roadway to be compensated for. The algorithm then proceeds to 514 and 516.

At 514, it is determined whether the vehicle is traveling outside of an expected roadway curve, to the level of accuracy of the radar system. If it is determined that the vehicle is following the curve of the road, the algorithm proceeds to 520, otherwise the algorithm feeds an input to the fuzziness factor block 518 that is applied to the estimated trajectory.

At 516, it is determined whether the vehicle is weaving, such as in the example illustrated in FIG. 3 by changing direction within the roadway by crossing from one side to the other of a trend line. If it is determined that the vehicle is not weaving, the algorithm proceeds to 520, otherwise the algorithm feeds an input to the fuzziness factor block 518 that is applied to the estimated trajectory. The algorithm then proceeds from 518 to 520.

Figure 6:
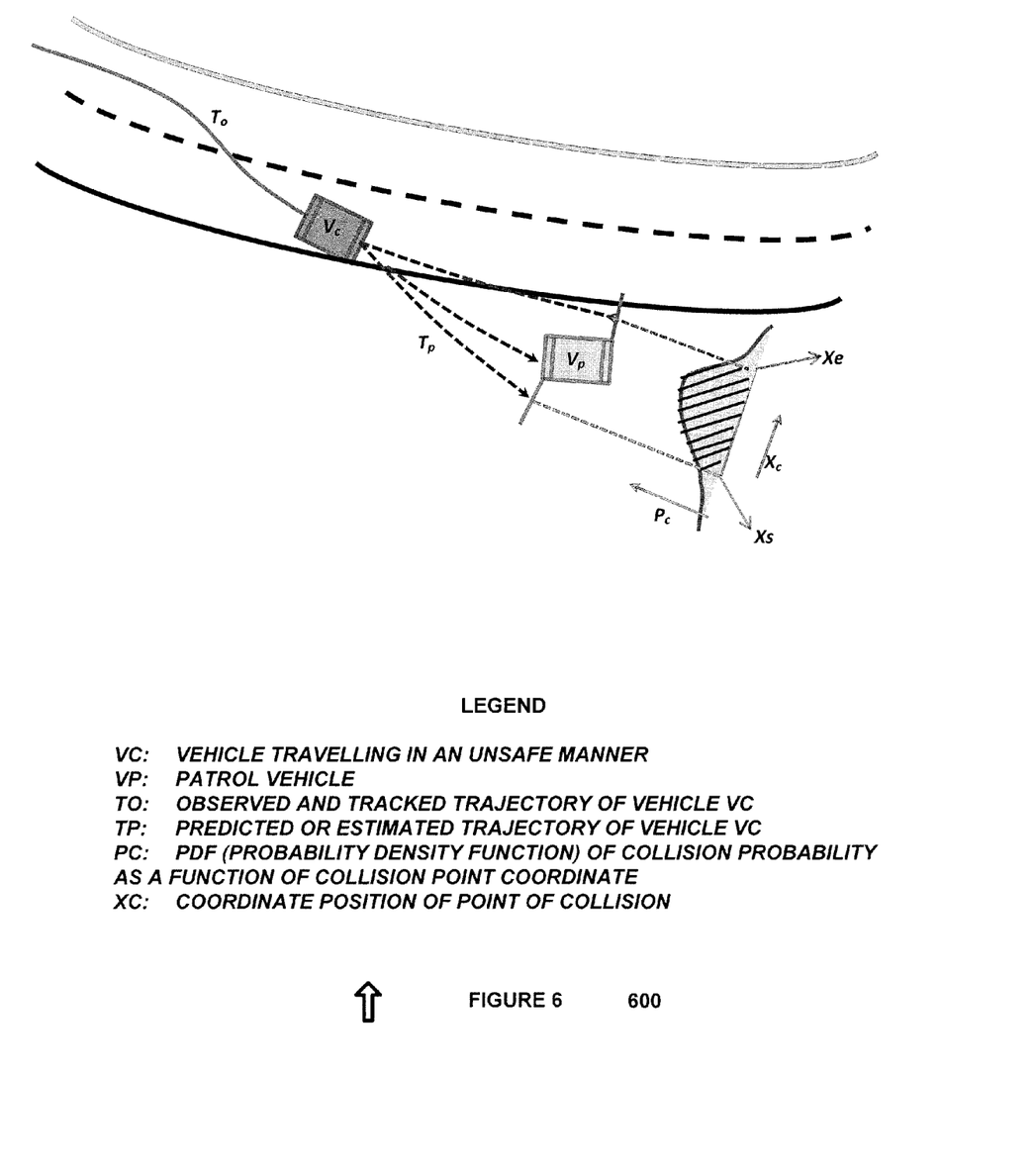
FIG. 6 is a diagram of probability density function, in accordance with an exemplary embodiment of the present disclosure.

At 520, the estimated trajectories from 506 are further refined and used in conjunction with the fuzziness factor in 518, vehicle orientation data generated at 522 and vehicle outline data generated at 524 to generate a probability density function with respect to the point of collision Xc of the approaching vehicle and the patrol car as shown the exemplary embodiment of FIG. 6. The vehicle orientation data generated at 522 can be generated by tracking changes in vehicle direction and location over time and by further comparing the changes in vehicle direction and location with map data to determine whether the vehicle is following the roadway. The vehicle outline data can be generated at 524 based on the orientation of the patrol car or in other suitable manners.

The fuzziness factor can be a function of the degree to which the vehicle is weaving or off-the-road, such as weaving or driving off road excessively or mildly. The degree of either behavior can be used to modify the standard deviation of a random variable added to a probable point of collision. The degree of weaving can also or alternatively depend on the amplitude and frequency of fluctuations of vehicle path about its trend line. If X is a random variable with a certain probability density function determined by 506 (in conjunction with 522 and 524), a resultant probability density function Z used to integrate between the extreme points of collision to get a probability of collision will come from the random variable Z=X+Y+W, where Y is a random variable with a distribution having a standard deviation proportional to a degree of weaving and W is a random variable with a distribution having a standard deviation proportional to the degree of going off-road.

The statistics of the random variables X, Y and Z can be determined by empirical, statistical-simulation or theoretical methods such as curve fitting and extrapolation, using vehicular and driver control kinematic constraints or in other suitable manners. The random variables X, Y, Z and W can be independent of each other, can be dependent on one or more of each other, or can have other suitable relationships. The algorithm then proceeds from 520 to 526, 528 and 530.

At 526, the probability of collision is calculated by integrating a probability density function of the trajectories between the extreme points of collision, Xs and Xe, as shown in FIG. 6. In one exemplary embodiment, the probability density function can be dynamically adjusted based on vehicular data such as vehicle speed, vehicle distance, vehicle position and orientation history and other suitable data, using historical data for other similar vehicles having similar vehicular data. In this exemplary embodiment, the historical data can be generated using decoys in the field, so as to allow the behavior of impaired drivers to be monitored without placing any personnel in harm's way. Likewise, the historical data that is used to generate the probability density functions can be generated in other suitable manners. The algorithm then proceeds to 532.

At 528, the trajectory estimates from 520 are used in conjunction with target tracking data in 506 to estimate a time to collision. The algorithm then proceeds to 532.

At 530, the trajectory estimates from 520 are used in conjunction with target tracking data in 506 to estimate the speed at collision. The algorithm then proceeds to 532.

At 532, an alarm is generated, such as by activating a device that causes ticking tones to be generated. Likewise, existing alarm settings can be updated based on current information. The frequency, volume and cadence of the alarm can be selected as a function of the instantaneous probability of a collision (as determined from the probability density function, the collision severity (as determined from the speed of the approaching vehicle), imminence of a collision (as determined by the distance between the approaching vehicle and the patrol vehicle), or other suitable factors. The rear and front side alarms can be distinguished by either single or double (paired) ticks or in other suitable manners. After the alarm settings are set or updated, the algorithm returns to 502.

In operation, algorithm 500 can be used to monitor approaching vehicles to determine whether they are weaving, whether they are following the road or if other conditions exist that indicate the presence of a potentially impaired driver. These conditions are factored together to determine if the predicted trajectory of each vehicle is likely to cause a collision or pose an imminent danger to a patrol vehicle or a nearby person or vehicle. Algorithm 500 generates an alarm to alert an operator of the system of a vehicle that is travelling in an unsafe manner and to provide an indicator of the proximity of the approaching vehicle so that the system operator may take evasive or corrective action. Although algorithm 500 is shown as a flow chart, algorithm 500 can also or alternatively be implemented as a state diagram, using object oriented programming or in other suitable programming paradigms.

FIG. 6 is a diagram of probability density function, in accordance with an exemplary embodiment of the present disclosure. As shown in FIG. 6, a vehicle traveling in an unsafe manner relative to a patrol car can be modeled as having a probability density function associated with the point of impact.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A method for detecting an erratic driver comprising:
generating a sequence of frames of radar data using a radar system that provides speed data and location data for targets in a radar signal and assigns a unique identifier to each target;
receiving the sequence of frames of radar data at a processor;
generating target trajectory data for a vehicle using the processor;
generating an alarm as a function of the target trajectory data; and wherein generating the target trajectory data for the vehicle using the processor comprises generating a probability density function for the vehicle.

2. The method of claim 1 further comprising: generating location data for a patrol car associated with the radar system; and modifying the target trajectory data as a function of the location data.

3. The method of claim 1 further comprising:
generating road map data; and
modifying the target trajectory data as a function of the road map data.

4. The method of claim 1 further comprising:
generating a first audio indicator for vehicles approaching from a front of a patrol vehicle; and
generating a second audio indicator for vehicles approaching from a rear of the patrol vehicle.

5. The method of claim 1 further comprising increasing or decreasing a tone frequency of an audio indicator as a function of a location of one or more of the target vehicles.

6. The method of claim 1 further comprising increasing or decreasing a volume of an audio indicator as a function of a location of one or more of the target vehicles.

7. The method of claim 1 further comprising changing a cadence of an audio indicator as a function of a location of one or more of the target vehicles.

8. The method of claim 1 wherein generating the target trajectory data for the vehicle using the processor comprises applying a fuzziness factor to the target trajectory data as a function of vehicle weaving data.

9. The method of claim 1 wherein generating the target trajectory data for the vehicle using the processor comprises extrapolating a vehicle position for the vehicle as a function of historical location data for the vehicle.

10. The method of claim 1 wherein generating the target trajectory data for the vehicle using the processor comprises extrapolating a vehicle elevation for the vehicle as a function of historical elevation data for the vehicle.

11. The method of claim 1 wherein generating the target trajectory data for the vehicle using the processor comprises:
generating a first probability density function for the vehicle at a first time;
generating a second probability density function for the vehicle at a second time; and
determining whether the first probability density function is different from the second probability density function.

12. The method of claim 1 further comprising determining a type of impairment as a function of target trajectory data of the vehicle.

13. The method of claim 1 wherein generating the target trajectory data for the vehicle using the processor comprises generating a probability density function corresponding to a probability of points of impact at an intersection of predicted target trajectory data with a vehicle outline.

14. The method of claim 1 wherein generating the target trajectory data for the vehicle using the processor comprises applying a fuzziness factor that increases a standard deviation of a probability density function as a function of vehicle weaving and erratic target trajectory data.

15. The method of claim 1 wherein generating the target trajectory data for the vehicle using the processor comprises applying a fuzziness factor that increases a standard deviation of a probability density function as a function of a target trajectory deviating from a normal path as indicated from road map information.

16. A method for detecting an erratic driver comprising:
generating a sequence of frames of radar data using a radar system that provides speed data and location data for targets in a radar signal and assigns a unique identifier to each target;
receiving the sequence of frames of radar data at a processor;
generating target trajectory data for a vehicle using the processor;
generating an alarm as a function of the target trajectory data; and
wherein generating the target trajectory data for the vehicle using the processor comprises extrapolating a vehicle elevation for the vehicle as a function of historical elevation data for the vehicle.

17. The method of claim 16 further comprising increasing or decreasing a tone frequency of an audio indicator as a function of a location of one or more of the target vehicles.

18. The method of claim 17 further comprising: generating location data for a patrol car associated with the radar system; and modifying the target trajectory data as a function of the location data.

19. The method of claim 16 further comprising: generating location data for a patrol car associated with the radar system; and modifying the target trajectory data as a function of the location data.

20. The method of claim 16 further comprising changing a cadence of an audio indicator as a function of a location of one or more of the target vehicles.

21. The method of claim 16 further comprising increasing or decreasing a volume of an audio indicator as a function of a location of one or more of the target vehicles.

22. A method for detecting an erratic driver comprising:
generating a sequence of frames of radar data using a radar system that provides speed data and location data for targets in a radar signal and assigns a unique identifier to each target;
receiving the sequence of frames of radar data at a processor;
generating target trajectory data for a vehicle using the processor;
generating an alarm as a function of the target trajectory data;
wherein generating the target trajectory data for the vehicle using the processor comprises:
generating a first probability density function for the vehicle at a first time;
generating a second probability density function for the vehicle at a second time; and
determining whether the first probability density function is different from the second probability density function.

23. The method of claim 22 further comprising: generating location data for a patrol car associated with the radar system; and modifying the target trajectory data as a function of the location data.

24. The method of claim 22 further comprising increasing or decreasing a tone frequency of an audio indicator as a function of a location of one or more of the target vehicles.

25. A method for detecting an erratic driver comprising:
generating a sequence of frames of radar data using a radar system that provides speed data and location data for targets in a radar signal and assigns a unique identifier to each target;
receiving the sequence of frames of radar data at a processor;

generating target trajectory data for a vehicle using the processor;

generating an alarm as a function of the target trajectory data; and determining a type of impairment as a function of target trajectory data of the vehicle.

26. The method of claim 25 further comprising: generating location data for a patrol car associated with the radar system; and modifying the target trajectory data as a function of the location data.

27. A method for detecting an erratic driver comprising:

generating a sequence of frames of radar data using a radar system that provides speed data and location data for targets in a radar signal and assigns a unique identifier to each target;

receiving the sequence of frames of radar data at a processor;

generating target trajectory data for a vehicle using the processor;

generating an alarm as a function of the target trajectory data; and wherein generating the target trajectory data for the vehicle using the processor comprises generating a probability density function corresponding to a probability of points of impact at an intersection of predicted target trajectory data with a vehicle outline.

28. The method of claim 27 further comprising: generating location data for a patrol car associated with the radar system; and modifying the target trajectory data as a function of the location data.

29. A method for detecting an erratic driver comprising:

generating a sequence of frames of radar data using a radar system that provides speed data and location data for targets in a radar signal and assigns a unique identifier to each target;

receiving the sequence of frames of radar data at a processor;

generating target trajectory data for a vehicle using the processor;

generating an alarm as a function of the target trajectory data;

wherein generating the target trajectory data for the vehicle using the processor comprises applying a fuzziness factor that increases a standard deviation of a probability density function as a function of vehicle weaving and erratic target trajectory data.

30. The method of claim 29 further comprising: generating location data for a patrol car associated with the radar system; and modifying the target trajectory data as a function of the location data.

31. A method for detecting an erratic driver comprising:

generating a sequence of frames of radar data using a radar system that provides speed data and location data for targets in a radar signal and assigns a unique identifier to each target;

receiving the sequence of frames of radar data at a processor;

generating target trajectory data for a vehicle using the processor;

generating an alarm as a function of the target trajectory data;

wherein generating the target trajectory data for the vehicle using the processor comprises applying a fuzziness factor that increases a standard deviation of a probability density function as a function of a target trajectory deviating from a normal path as indicated from road map information.

32. The method of claim 31 further comprising: generating location data for a patrol car associated with the radar system; and modifying the target trajectory data as a function of the location data.

* * * * *